(12) United States Patent
Kim et al.

(10) Patent No.: US 11,757,911 B2
(45) Date of Patent: *Sep. 12, 2023

(54) METHOD AND SYSTEM FOR PROVIDING SECURITY ON IN-VEHICLE NETWORK

(71) Applicants: Hyundai Motor Company, Seoul (KR); Kia Corporation, Seoul (KR)

(72) Inventors: Se Il Kim, Seongnam-si (KR); Seong Yong Kang, Suwon-si (KR); A Ram Cho, Yongin-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/854,966

(22) Filed: Jun. 30, 2022

(65) Prior Publication Data

US 2022/0337616 A1 Oct. 20, 2022

Related U.S. Application Data

(63) Continuation of application No. 16/587,727, filed on Sep. 30, 2019, now Pat. No. 11,381,585.

(30) Foreign Application Priority Data

Feb. 21, 2019 (KR) ........................ 10-2019-0020568

(51) Int. Cl.
*H04L 9/40* (2022.01)
*H04W 80/02* (2009.01)
(Continued)

(52) U.S. Cl.
CPC ........ *H04L 63/1425* (2013.01); *H04L 9/0825* (2013.01); *H04L 9/3242* (2013.01);
(Continued)

(58) Field of Classification Search
CPC . G06F 21/44; H04L 63/0823; H04L 63/1425; H04L 63/1433; H04L 9/0825; H04L 9/3242; H04W 4/48; H04W 80/02
See application file for complete search history.

(56) References Cited

U.S. PATENT DOCUMENTS 8,798,852 B1 8/2014 Chen et al.
9,132,790 B2 9/2015 Miyake
(Continued)

*Primary Examiner* — Linglan Edwards
(74) *Attorney, Agent, or Firm* — Slater Matsil, LLP

(57) ABSTRACT

According to an aspect, a method is performed by a first controller for providing security for second controllers in an in-vehicle network. An inherent information request is transmitted to a suspicious controller of the plurality of second controllers for an inherent information of the suspicious controller. The inherent information request includes a certificate assigned to the first controller. An encrypted inherent information of the suspicious controller is received from the suspicious controller and a decrypted inherent information is compared with a pre-stored inherent information. The suspicious controller is determined to be an anomalous controller when the decrypted inherent information is different from the pre-stored inherent information. In response to receiving an update request from a backend server for a specified controller out of the plurality of second controllers, the inherent information request including the certificate assigned is transmitted to the specified controller.

20 Claims, 5 Drawing Sheets

(51) Int. Cl.
  *H04L 9/32*   (2006.01)
  *H04W 4/48*   (2018.01)
  *H04L 9/08*   (2006.01)

(52) U.S. Cl.
  CPC ...... *H04L 63/0823* (2013.01); *H04L 63/1433* (2013.01); *H04W 4/48* (2018.02); *H04W 80/02* (2013.01)

(56) References Cited

U.S. PATENT DOCUMENTS

| | | |
|---|---|---|
| 9,413,732 B2 | 8/2016 | Koide et al. |
| 10,348,694 B2 | 7/2019 | Cho et al. |
| 10,708,062 B2 | 7/2020 | Hakuta et al. |
| 10,991,175 B2 * | 4/2021 | Zhang ................... H04L 63/062 |
| 2017/0302693 A1 | 10/2017 | Takada et al. |
| 2018/0007557 A1 | 1/2018 | Lee et al. |
| 2018/0270340 A1 | 9/2018 | Ahmad et al. |
| 2018/0278616 A1 * | 9/2018 | Sakamoto ............ G07C 5/0816 |
| 2020/0151972 A1 | 5/2020 | Nakajima et al. |
| 2020/0211301 A1 | 7/2020 | Zhang et al. |
| 2020/0213287 A1 | 7/2020 | Zhang et al. |

* cited by examiner

METHOD AND SYSTEM FOR PROVIDING SECURITY ON IN-VEHICLE NETWORK

CROSS-REFERENCE TO RELATED APPLICATIONS

This application is a continuation application of U.S. patent application Ser. No. 16/587,727, filed on Sep. 30, 2019, which claims priority to Korean Patent Application No. 10-2019-0020568, filed on Feb. 21, 2019, which application is hereby incorporated herein by reference.

TECHNICAL FIELD

The present disclosure in some embodiments relates to a method and system for providing security in an in-vehicle network.

BACKGROUND

The statements in this section merely provide background information related to the present disclosure and do not necessarily constitute prior art.

A new generation of more luxury vehicles places a lot of emphasis on electronic control units (ECUs) and multimedia devices communicating with the internal, external devices, or infrastructures of automobiles which can even provide the in-vehicle operator with network access. For example, vehicle controls are widely used, including an access authentication controller for smartphone-based vehicle access and start service (Ex. IAU), a backup controller for storing an odometer value to prevent mileage alteration (Ex. ICU: Integrated Central control Unit), an electric charge controller for PnC (Plug and Charge) service (Ex. CCM: Charger Convertor Module), a controller serving as a vehicle communication unit and gateway (GW) (Ex. CCU: Communication Control Unit), and the like.

However, the vehicle when connected to the wireless communication and surrounding network environment becomes vulnerable to external attacks that affect the electronic control device through the network. Various controllers provide the vehicle driver with a customized service by storing vital information on charging and authentication, etc. (credit card number, personal information, vehicle information, etc.), where such controllers may be stolen or duplicated to face the consequences as follows: when an electric charge controller pilfered from vehicle A is connected to vehicle B for receiving an electric charge through the vehicle charger, the owner of vehicle A, not vehicle B, could be wrongly charged for the fueling. Further, when vehicle A has lower mileage than vehicle B, connecting a pilfered mileage backup controller from vehicle A to vehicle B results in a manipulated lower mileage of vehicle B.

These issues can lead to theft of the vehicle or financial damage of the owner and further to serious safety problems of the driver. Currently, mass-produced vehicles are not equipped or inadequately equipped with satisfactory protective measures.

SUMMARY

The present disclosure in some embodiments seeks to provide a method and system for providing security in an in-vehicle network, wherein, to safely protect vital information of a vehicle and an owner from malicious behavior by detecting a stolen or duplicated controller when mounted on the vehicle, a first controller is configured to collect and store in advance the integrity information of the main information (such as boot loader and MAC information) of at least one or more second controllers, to be responsive to a verification request received from a backend server for obtaining integrity information from each of the second controllers and comparing the integrity information with the stored integrity information and thereby determining whether or not the second controller is stolen or duplicated, to ensure integrity of the vital information of the controller.

At least one aspect of the present disclosure provides a method performed by a first controller for providing security for a plurality of second controllers in an in-vehicle network, including transmitting an inherent information request to a suspicious controller of the plurality of second controllers for an inherent information of the suspicious controller, the inherent information request including a certificate assigned to the first controller, and receiving an encrypted inherent information of the suspicious controller from the suspicious controller, the encrypted inherent information having been encrypted with a public key associated with the certificate, and using a private key associated with the certificate for obtaining a decrypted inherent information from the encrypted inherent information, and comparing the decrypted inherent information with a pre-stored inherent information, and determining the suspicious controller to be an anomalous controller when the decrypted inherent information is different from the pre-stored inherent information.

Another aspect of the present disclosure provides an apparatus for providing security for a plurality of second controllers in an in-vehicle network, including a request transmission unit, an inherent information reception unit, an inherent information extraction unit, a storage unit, a comparison unit, and a verification unit. The request transmission unit is configured to transmit an inherent information request to a suspicious controller out of the plurality of second controllers, the inherent information request including a certificate assigned to the apparatus. The inherent information reception unit is configured to receive encrypted inherent information of the suspicious controller from the suspicious controller, the encrypted inherent information having been encrypted with a public key associated with the certificate.

The inherent information extraction unit is configured to utilize a private key associated with the certificate for obtaining a decrypted inherent information from the encrypted inherent information having been received by the inherent information reception unit. The storage unit is configured to store inherent information of the second controllers in association with the second controllers. The comparison unit is configured to compare the decrypted inherent information extracted by the inherent information extraction unit with the inherent information having been stored in the storage unit. The verification unit is configured to determine the suspicious controller to be an anomalous controller when the comparison unit concludes that the decrypted inherent information is different from the inherent information having been stored in the storage unit.

Yet another aspect of the present disclosure provides a system for providing security in an in-vehicle network, including a plurality of second controllers connected to an external device or an infrastructure to control a vehicle, a backend server configured to request verification of a suspicious controller among the plurality of second controllers, and a first controller configured to perform verification of the suspicious controller upon receiving a verification request for the suspicious controller from the backend server. Here, the first controller includes a request transmission unit, an inherent information reception unit, an inherent information extraction unit, a storage unit, a comparison unit and a verification unit. The request transmission unit is configured to transmit an inherent information request to a suspicious controller out of the plurality of second controllers, the inherent information request including a certificate assigned to the first controller.

The inherent information reception unit is configured to receive an encrypted inherent information of the suspicious controller from the suspicious controller, the encrypted inherent information having been encrypted with a public key associated with the certificate. The inherent information extraction unit is configured to utilize a private key associated with the certificate for obtaining a decrypted inherent information from the encrypted inherent information having been received by the inherent information reception unit. The storage unit is configured to store inherent information of the second controllers in association with the second controllers. The comparison unit is configured to compare the decrypted inherent information extracted by the inherent information extraction unit with the inherent information having been stored in the storage unit. The verification unit is configured to determine the suspicious controller to be an anomalous controller when the comparison unit concludes that the decrypted inherent information is different from the inherent information having been stored in the storage unit.

As described above, according to at least one embodiment of the present disclosure, the method and system for providing security in an in-vehicle network is capable of protecting data stored and managed for providing a customized service not only from a hacking threat but also from a physical attack such as theft and duplication incidents. In view of the difficulty for a specific normal controller to directly control the operation of an anomalous controller, utilizing the backend server by taking account of connected car environment can prevent malicious use of the anomalous controller by restricting the service of the anomalous controller.

Figure 1:
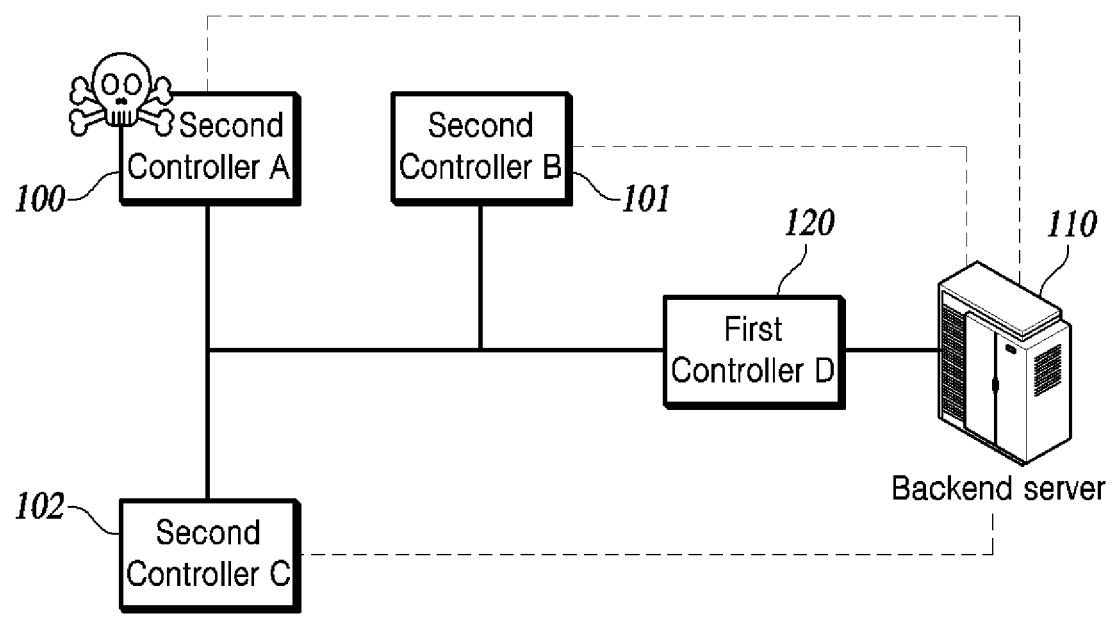
FIG. 1 is a diagram of a system for providing security in an in-vehicle network according to at least one embodiment of the present disclosure.

The following reference numerals can be used in conjunction with the drawings:

100, 101, 102: second controller
110: backend server
120: first controller
200: certificate transmission unit
201: request transmission unit
210: inherent information reception unit
220: inherent information extraction unit
230: storage unit
240: comparison unit
250: verification unit
260: verification result transmission unit

DETAILED DESCRIPTION OF ILLUSTRATIVE EMBODIMENTS

Hereinafter, some embodiments of the present disclosure will be described in detail with reference to the accompanying drawings. In the following description, like reference numerals designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely for the purpose of differentiating one component from the other, not to imply or suggest the substances, the order or sequence of the components. Throughout this specification, when a part "includes" or "comprises" a component, the part is meant to further include other components, not excluding thereof unless specifically stated to the contrary. The terms such as "unit," "module," and the like refer to one or more units for processing at least one function or operation, which may be implemented by hardware, software, or a combination thereof.

FIG. 1 is a diagram of a system for providing security in an in-vehicle network according to at least one embodiment of the present disclosure.

As shown in FIG. 1, a system for providing security in an in-vehicle network according to at least one embodiment includes one or more second controllers 100, 101 and 102, a backend server 110, and a first controller 120.

The at least one second controllers 100, 101 and 102 according to at least one embodiment is connected to an external device or infrastructure to control a vehicle. The second controllers 100, 101 and 102 according to at least one embodiment includes, but not limited to, an access authentication controller for smartphone-based vehicle access and start service (Ex. IAU), a backup controller for storing an odometer value to prevent mileage alteration (Ex. ICU: Integrated Central control Unit), an electric charge controller for Plug and Charge (PnC) service (Ex. CCM: Charger Convertor Module), a controller serving as a vehicle communication unit and gateway (GW) (Ex. CCU: Communication Control Unit), and the like among other controllers for controlling vehicles.

The second controllers 100, 101 and 102 in at least one embodiment verify a certificate received with an inherent information request including the certificate from the first controller 120 which will be described below. Here, the certificate is one assigned to the first controller 120. When controllers 100, 101 and 102 succeed in verifying the certificate, they encrypt their own inherent information with a pre-transmitted public key and transmit the encrypted inherent information to the first controller 120. Here, the encrypted inherent information is inherent information encrypted with a public key associated with the certificate. In this case, the information encrypted with the public key may be a boot loader, MAC information, etc. of the second controllers 100, 101, 102. The encryption is not performed on the very information of the second controllers 100, 101, 102 but performed on the hash values of the information. At least one embodiment, by utilizing the 'MAC (HMAC) based on hash function' as the input value for the encryption/ decryption, advantageously saves the need for management of the load of the calculation amount and separate key management.

The backend server 110 according to at least one embodiment requests the first controller 120 to verify a suspicious controller 100 among the one or more second controllers 100, 101 and 102. The backend server 110 in receipt of notification through the detection function such as an intrusion detection system (IDS), requests the first controller 120 to determine the suspicious controller 100 of the second controllers 100, 101 and 102 whether it is a fake/duplicate. When the first controller 120 determines that the suspicious controller 100 is a problematic anomalous controller, the backend server 110 provides a limited service to the anomalous controller according to the backend system policy.

It is generally difficult for a specific normal controller to directly control the operation of an anomalous controller, but at least one embodiment utilizes the backend server 110 in consideration of the connected car environment, to prevent malicious use of the service by limiting the service for the anomalous controller.

The first controller 120 according to at least one embodiment performs verification of the suspicious controller 100 among the one or more second controllers 100, 101 and 102 when it receives a verification request from the backend server 110.

Figure 2:
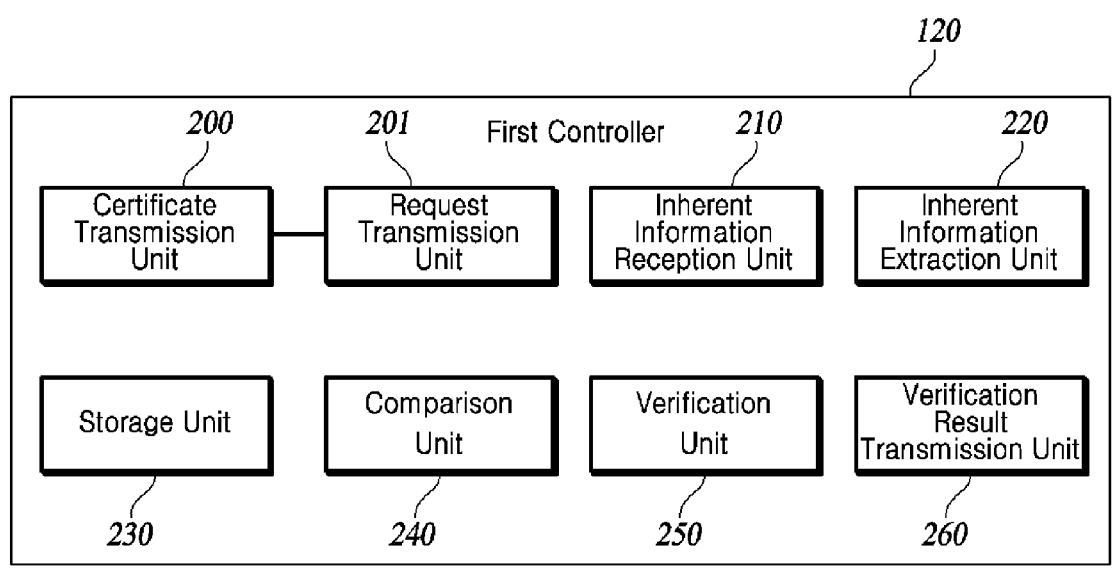
FIG. 2 is a schematic diagram of the detailed configuration of a first controller 120 according to at least one embodiment of the present disclosure.

FIG. 2 is a schematic diagram of the detailed configuration of the first controller 120 according to at least one embodiment of the present disclosure.

As shown in FIG. 2, the first controller 120 according to at least one embodiment includes a certificate transmission unit 200, a request transmission unit 201, an inherent information reception unit 210, an inherent information extraction unit 220, a storage unit 230, a comparison unit 240, a verification unit 250 and a verification result transmission unit 260.

The certificate transmission unit 200 according to at least one embodiment is responsive to when the plurality of second controllers 100, 101 and 102 is woken up for the first time after the first controller 120 is woken up, for transmitting the certificate to the second controllers 100, 101 and 102, which is assigned to the first controller 120. Once the first controller 120 is woken up by an initial setting step and when an information table of the storage unit 230 is empty of an attribute value (critical information of the second controller), there is a wait until the second controllers 100, 101 and 102 are woken up to transmit the certificate, and thereby embark on with the initial setting process.

The request transmission unit 201 according to at least one embodiment transmits, to the suspicious controller 100 which verification is requested by the backend server 110, a request for inherent information by including the certificate received from the certificate transmission unit 200.

In particular, the second controllers 100, 101 and 102 according to at least one embodiment pre-store a public key (Cert chain) for verifying the certificate of the first controller 120, and hence when they receive the certificate from the first controller 120, they can utilize the pre-stored public key to verify the certificate, thereby confirming whether the first controller 120 is anomalous (fake/duplicative). Therefore, by taking failure of authentication as a hacking occurred in the controller system, and then as an attacker infiltrating into the second controllers 100, 101 and 102 or the first controller 120, the system of the present disclosure can determine the second controller failed to be authenticated as an anomalous controller, and take subsequent actions such as sending an intrusion alert message to the backend server 110. When no response is received for a preset duration from one or more of the second controllers 100, 101 and 102 upon receiving the inherent information request, the relevant one of the second controllers 100, 101 and 102 may be determined to be an anomalous controller.

Meanwhile, in at least one embodiment, when the request transmitter 201 requests the inherent information to the second controllers 100, 101 and 102, it may transmit not only a certificate but also a random value to enhance security.

The inherent information reception unit 210 according to at least one embodiment is responsive to when the second controllers 100, 101, 102 in receipt of the certificate from the certificate transmission unit 200 or from the request transmission unit 201 succeeds in verifying that certificate, for receiving encrypted information after encrypting the inherent information of the second controllers 100, 101, 102 from the same controllers. Herein, the inherent information of the second controllers 100, 101, 102 may include, but not limited to, boot loader, or MAC information, and the like among other information that can represent information inherent to the second controllers 100, 101 and 102.

In addition, the inherent information of the second controllers 100, 101 and 102 transmitted to the inherent information reception unit 210 of at least one embodiment is encrypted and transmitted using a pre-stored public key. In this case, what is encrypted is not the inherent information itself but a hash value of the information for the second controllers 100, 101 and 102. Therefore, utilizing the 'MAC (HMAC) based on hash function' as the input value for the encryption obviates the need for management of the load of the calculation amount and separate key management. In addition, at least one embodiment can add a random value when encrypting the inherent information in the second controllers 100, 101 and 102, to provide enhanced security.

The inherent information extraction unit 220 according to at least one embodiment uses the above-described private key related to the certificate to obtain decrypted inherent information from the encrypted inherent information received by the inherent information reception unit 210. In at least one embodiment, an asymmetric key pair (private key/public key) of the first controller 120 is used for secure communication.

The storage unit 230 according to at least one embodiment stores inherent information of one or more second controllers 100, 101 and 102 in correspondence with the respective second controllers 100, 101 and 102. The initial setting by at least one embodiment includes receiving, when the first controller 100, 101, 102 is first woken up, inherent information, obtaining the inherent information decrypted by the inherent information extraction unit 220, and storing the second controllers 100, 101 and 102 in correspondence with the relevant inherent information in the storage unit 230, thereby performing the initial setting.

In at least one embodiment, inherent information stored in the storage unit 230 is stored in a table format in matching relation with the second controllers 100, 101, 102, and the table may be stored in a hardware security module (HSM) or encrypted and securely stored.

The comparison unit 240 compares the decrypted inherent information obtained by the inherent information extraction unit 220 with inherent information corresponding to the suspicious controller 100, which is pre-stored in the storage unit 230.

The verification unit 250 according to at least one embodiment checks, based on the result of comparison by the comparison unit 230, if the decrypted inherent information is different from the pre-stored inherent information in the storage unit 230, corresponding to the suspicious controller 100, and if yes, it determines the suspicious controller 100 as an anomalous controller.

The verification result transmission unit 260 according to at least one embodiment transmits the determination result from the verification unit 250 to the backend server 110 as to whether the suspicious controller 100 is determined to be an anomalous controller. Here, the backend server 110 in receipt of the determination result that the suspicious controller 100 is determined to be an anomalous controller from the verification result transmission unit 260, may perform subsequent actions such as restricting the use of the suspicious controller 100.

Meanwhile, the request transmitter 201 of at least one embodiment is responsive to an update request from the backend server 110, for a specified controller that needs to be updated among any of the second controllers 100, 101 and 102, for transmitting an inherent information request containing the certificate to the specified controller. At this time, when the inherent information reception unit 210 of at least one embodiment succeeds in verifying the certificate with the specified controller in receipt of the certificate, it receives encrypted information after encrypting the inherent information of the specified controller from the same specified controller. In addition, the inherent information extraction unit 220 of at least one embodiment decrypts the information received by the inherent information receiver 210 by using the private key to obtain inherent information, and then updates/stores the decrypted inherent information in correspondence with the specified controller in the storage unit 230, thereby updating the controller information.

Figure 3:
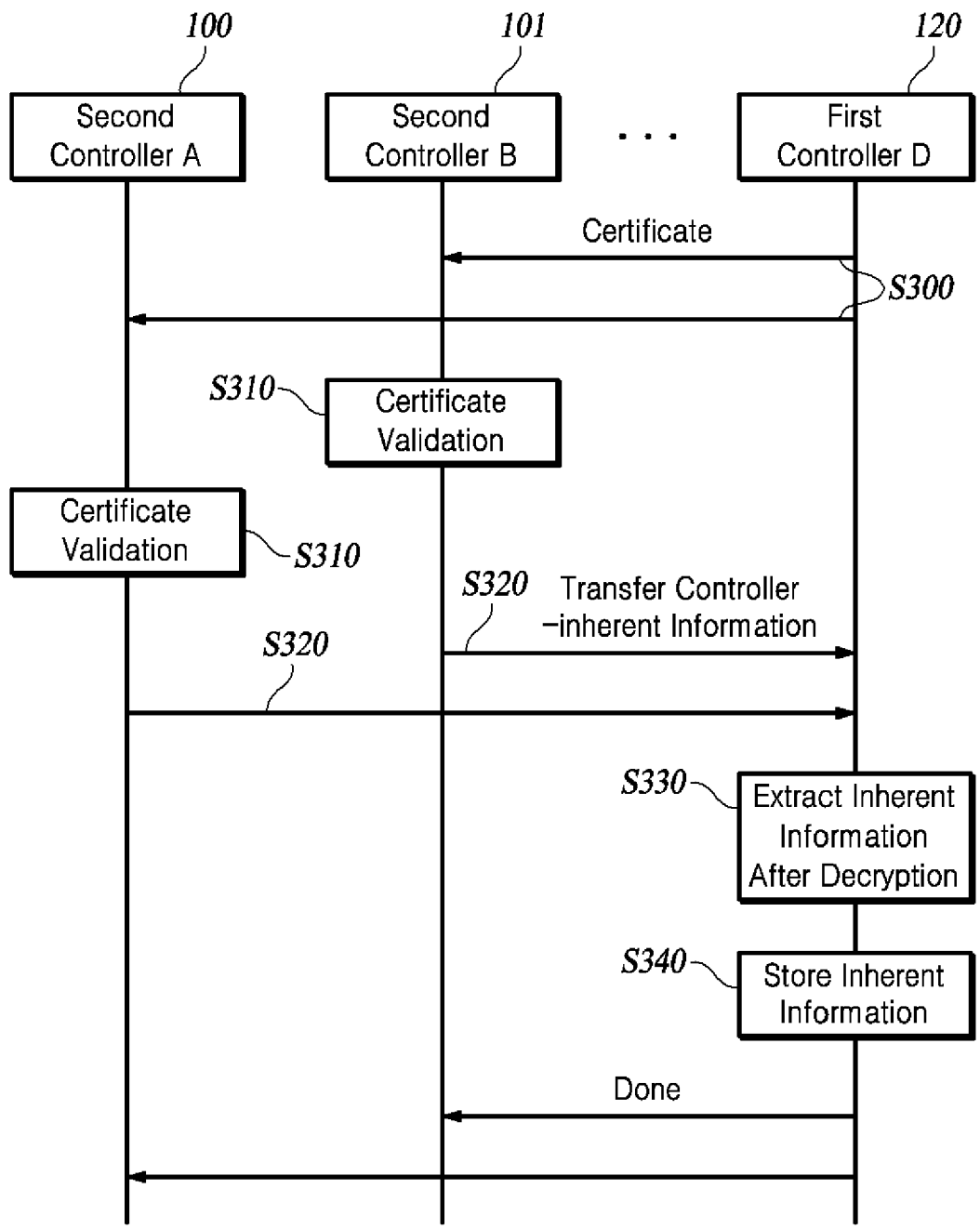
FIG. 3 is a flowchart of an example initial setting process for providing security in the in-vehicle network according to at least one embodiment of the present disclosure.

FIG. 3 is a flowchart of an example initial setting process for providing security in the in-vehicle network according to at least one embodiment of the present disclosure.

At the outset, when a plurality of second controllers 100, 101 and 102 is first woken up after the first controller 120 of at least one embodiment is woken up, the certificate, which is assigned to the first controller 120, is transmitted to the relevant one of the second controllers 100 and 101 (Step S300). Once the first controller 120 is woken up to find that an information table of the storage unit 230 is empty of an attribute value (critical inherent information of the second controller), the process waits until the relevant controllers 100, 101 are actuated, to transmit the certificate.

Next, the second controllers 100, 101 in receipt of the certificate perform verification of the certificate received from the certificate transmission unit 200 of the first controller 120 (S310). In particular, the relevant second controllers 100, 101 according to at least one embodiment pre-stores a public key (Cert chain) for verifying the certificate of the first controller 120, and when they receive the certificate from the first controller 120, they can utilize the pre-stored public key to verify the certificate, thereby confirming whether the first controller 120 is anomalous (fake/duplicative).

Next, when the second controllers 100, 101 of at least one embodiment succeed in verifying the certificate, they transmit information that is the inherent information encrypted with the public key pre-stored (S320). In this case, the information encrypted with the public key may be the boot loader, MAC information, etc. of the second controllers 100, 101, which are encrypted, not the information of the second controllers 100, 101 themselves. At least one embodiment, utilizing the 'MAC (HMAC) based on hash function' as the input value for the encryption, obviates the need for management of the load of the calculation amount and separate key management. This can be expressed by a simplified equation as follows.

$$\text{Encrypted info\_}A = \text{Enc\_pub\_}D(\text{HMAC}(\text{inherent information of ECU\_}A))$$

At this time, at least one embodiment adds a random value to generate Encrypted info_A, and thereby provides enhanced security.

Next, in order to acquire decrypted inherent information from the received encrypted inherent information, the inherent information extraction unit 220 of the first controller 120 of at least one embodiment utilizes the above-described private key associated with the certificate to extract inherent information (S330). At least one embodiment utilizes the asymmetric key pair (private key/public key) of the first controller 120 for secure communication, and therefore the inherent information extraction unit 220 of the first controller 120 extracts the respective controller-inherent information through the private key of the first controller 120 as follows.

$$\text{Dec\_pri\_}D(\text{Encrypted info\_}A) \rightarrow \text{HMAC}(\text{ECU\_}A \text{ inherent information})$$

Then, the storage unit 230 of the first controller 120 of at least one embodiment stores the inherent information extracted by the inherent information extraction unit 220 in correspondence with the second controllers 100 and 101 (S340).

Table 1 shows an example table format of inherent information stored in the storage unit 230 of at least one embodiment.

TABLE 1

| Second Controller | Second Controller Critical Information |
|---|---|
| A | HMAC (ECU_A inherent information) |
| B | HMAC (ECU_B inherent information) |
| ... | ... |

The present disclosure in some embodiments relates to a method and system for providing security in an in-vehicle network.

As shown in Table 1, at least one embodiment receives the inherent information from the second controllers 100, 101, and stores the received inherent information in correspondence with the second controllers 100, 101 in the storage unit 230 in a table format, whereby completing the initial setting.

Figure 4:
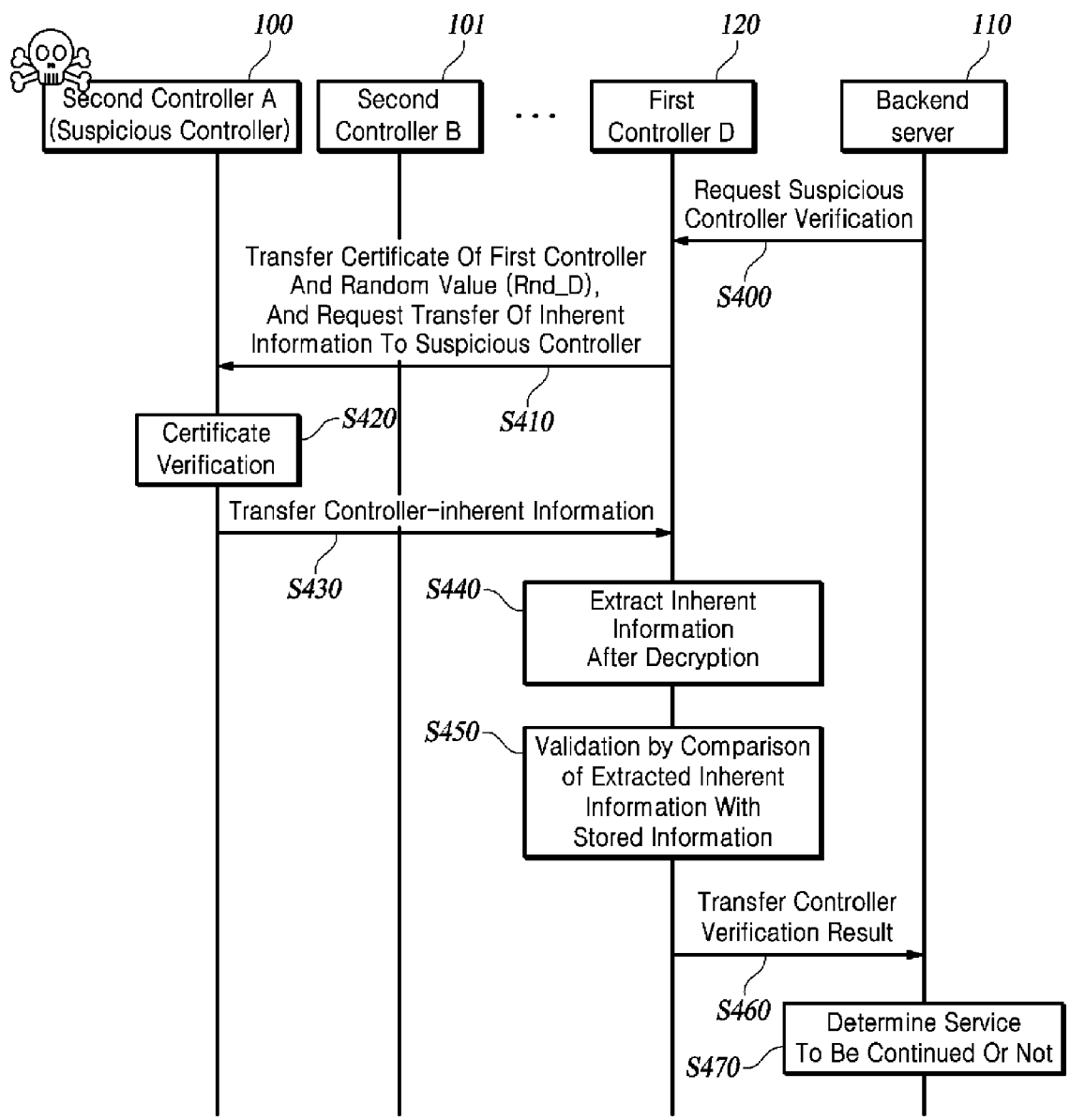
FIG. 4 is a flowchart of an example process for providing security in the in-vehicle network according to at least one embodiment of the present disclosure.

FIG. 4 is a flowchart of an example process for providing security in the in-vehicle network according to at least one embodiment of the present disclosure.

First, the backend server 110 of at least one embodiment requests the first controller 120 to verify the suspicious controller 100 between the arbitrary second controllers 100 and 101 (S400). The backend server 110 of at least one embodiment performs a verification request through the first controller 120 when there is a controller suspected of an anomalous operation.

Next, the first controller 120 in receipt of the verification request from the backend server 110 of at least one embodiment, sends the suspicious controller 100 an inherent information request including the certificate assigned to the first controller 120 (S410). In addition, when the request transmitter 201 of the first controller 120 of at least one embodiment, requests for delivery of the inherent information, it can transmit a random value (Rnd_D) as well as a certificate assigned to the first controller 120, thereby enhancing security.

Subsequently, the suspicious controller 100 of at least one embodiment in receipt of the inherent information request including the certificate, performs the verification of the certificate received from the request transmitter 201 of the first controller 120 (S420). As described above, since the suspicious controller 100 according to at least one embodiment pre-stores a public key (Cert chain) for verifying the certificate of the first controller 120, the suspicious controller 100, upon receipt of the inherent information request including the certificate, prioritizes the verification of the certificate by using the pre-stored public key to check whether the first controller 120 is anomalous (fake/duplicate).

Then, when the suspicious controller 100 succeeds in verifying the certificate, it transmits encrypted information that is the inherent information encrypted with a public key associated with the certificate (S430). At this time, the encrypted information encrypted with the public key may be the boot loader, MAC information, etc. of the suspicious controller 100. The encryption is not performed on the very information of the suspicious controller 100 but performed on the hash values of the information. As described above, at least one embodiment, by utilizing the 'MAC (HMAC) based on hash function' as the input value for the encryption/decryption, can advantageously obviate the need for management of the load of the calculation amount and separate key management. This can be expressed by a simplified equation as follows.

$$\text{Encrypted req\_info}\_A = \text{Enc\_pub}\_D(\text{HMAC}(\text{ECU}\_A) \text{ inherent information}, \text{Rnd}\_D)$$

Therefore, at least one embodiment can add random value Rnd_D for generating Encrypted req_info_A, to provide a security enhancement.

Now, the inherent information extraction unit 220 of the first controller 120 of at least one embodiment uses the private key associated with the certificate to extract decrypted inherent information from the encrypted inherent information (S440). As described above, since at least one embodiment utilizes the asymmetric key pair (private key/public key) of the first controller 120 for secure communication, the inherent information extraction unit 220 of the first controller 120 extracts the respective controller-inherent information through the private key of the controller 120 as follows.

$$\text{Dec\_pri}\_D(\text{Encrypted req\_info}\_A) \rightarrow \text{HMAC}(\text{ECU}\_A \text{ inherent information})$$

The comparison unit 240 of at least one embodiment then compares the inherent information extracted by the inherent information extraction unit 220 with inherent information corresponding to the suspicious controller 100, which is pre-stored in the storage unit 230 (in Step S450). When the subsequent comparison by the comparison unit 240 concludes that the extracted inherent information is different from the pre-stored inherent information corresponding to the suspicious controller 100, the verification unit 250 according to at least one embodiment determines the suspicious controller 100 as an anomalous controller, and the verification result transmission unit 260 according to at least one embodiment transmits that verification result to the backend server 110 (S460). On the other hand, when the comparison by the comparison unit 240 concludes that the extracted inherent information is identical to the pre-stored inherent information corresponding to the suspicious controller 100, the verification unit 250 according to at least one embodiment determines the suspicious controller 100 to be a normal controller, and the verification result transmission unit 260 according to at least one embodiment transmits that verification result to the backend server 110 (S460).

The backend server 110 of at least one embodiment determines whether to continue the service of the suspicious controller 100 according to the verification result transmitted from the verification result transmitter 260 of the first controller 120 (S470). For example, when the verification result is transmitted indicating that the suspicious controller 100 has been determined to be a problem controller, limited-service is performed to the anomalous controller according to the backend system policy. When the verification result is transmitted indicating the classified normal controller, the subsequent service is normally performed.

On the other hand, when the verification result of Step S420 is a failure, the suspicious controller 100 that failed authentication is determined to be an anomalous controller, and follow-up action can be taken such as sending an intrusion warning message to the backend server 110. In addition, when no response is received for a preset time from the suspicious controller 100 that received the inherent information request in Step S410, the suspicious controller 100 may be determined to be an anomalous controller to take follow-up action.

As described above, at least one embodiment is advantageous in that the controller becomes burdenless since the verification procedure is performed after the initial controller setting, in response to an anomalous behavior detection, or event-based.

Figure 5:
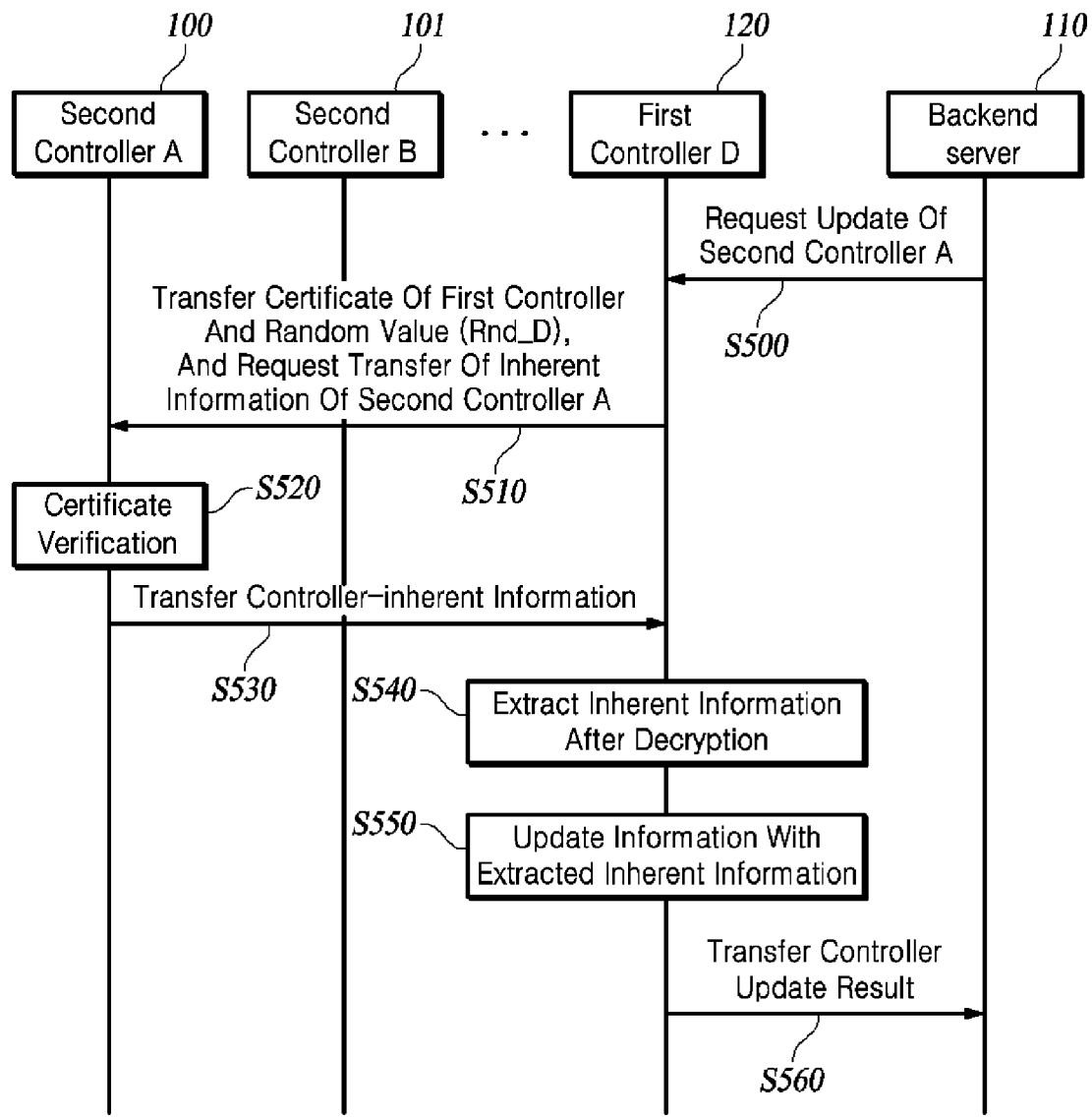
FIG. 5 is a flowchart of an example controller update process for providing security in the in-vehicle network according to at least one embodiment of the present disclosure.

FIG. 5 is a flowchart of an example controller update process for providing security in the in-vehicle network according to at least one embodiment of the present disclosure.

First, the backend server 110 of at least one embodiment requests the first controller 120 to update a specified controller 100 between arbitrary second controllers 100 and 101, which needs to be updated by the information table for reasons such as controller replacement (S500). Next, the first controller 120, upon receipt of the update request from the backend server 110 of at least one embodiment, transmits an inherent information request including its certificate to the specified controller 100 (S510). In addition, when the request transmitter 201 of the first controller 120 of at least one embodiment, requests for delivery of the inherent information, it can transmit a random value (Rnd_D) as well as the controller's own certificate, thereby enhancing security.

In Step S520, the specified controller 100 of at least one embodiment in receipt of the inherent information request including the certificate, performs verification of the certificate received from the request transmitter 201 of the first controller 120. As described above, since the specified controller 100 according to at least one embodiment pre-stores the public key (Cert chain) for verifying the certificate of the first controller 120, the specified controller 100 is responsive to the inherent information request including the certificate, upon receipt of the inherent information request including the certificate, prioritizes the verification of the certificate by using the pre-stored public key to check whether the first controller 120 is anomalous (fake/duplicate).

In Step S530, when the specified controller 100 of at least one embodiment successfully verifies the certificate, the specified controller 100 transmits encrypted information that is the inherent information encrypted with a public key associated with the certificate. In this case, the encrypted information that is encrypted with the public key may be the boot loader, MAC information, etc. of the specified controller 100, wherein the very information of the specified controller 100 is not encrypted, but the hash values of such information are encrypted. As described above, at least one embodiment, by utilizing the 'MAC (HMAC) based on hash function' as the input value for the encryption/decryption, advantageously saves the need for management of the load of the calculation amount and separate key management. This can be expressed by a simplified equation as follows.

$$\text{Encrypted req\_info\_}A=\text{Enc\_pub\_}D(\text{HMAC}(\text{ECU\_}A \text{ inherent information}),\text{Rnd\_}D)$$

Therefore, at least one embodiment can add random value Rnd_D for generating Encrypted req_info_A, to provide a security enhancement.

In Step S540, in order to acquire decrypted inherent information from the encrypted inherent information, the inherent information extraction unit 220 of the first controller 120 of at least one embodiment utilizes the private key associated with the certificate to extract inherent information of the specified controller 100. As described above, at least one embodiment utilizes the asymmetric key pair (private key/public key) of the first controller 120 for secure communication, and therefore the inherent information extraction unit 220 of the first controller 120 extracts the respective controller-inherent information through the private key of the first controller 120 as follows.

$$\text{Dec\_pri\_}D(\text{Encrypted req\_info\_}A)\rightarrow \text{HMAC}(\text{ECU\_}A \text{ inherent information})$$

In Step S550, the storage unit 230 of the first controller 120 of at least one embodiment stores the inherent information extracted by the inherent information extraction unit 220 in correspondence with the specified controller 100.

Table 2 shows an example table format of the inherent information stored/updated in the storage unit 230 of at least one embodiment.

TABLE 2

| Second Controller | Second Controller Critical Information |
|---|---|
| A | New HMAC (ECU_A inherent information) |
| B | HMAC (ECU_B inherent information) |
| ... | ... |

As shown in Table 2, at least one embodiment receives the inherent information from the specified controller 100, and stores/updates the received inherent information in correspondence with the specified controller 100 in the storage unit 230 in a table format, whereby completing the updating process.

The first controller 120 of at least one embodiment having completed the updating process transmits the controller update completion result to the backend server 110 (S560).

As described above, at least one embodiment in the initial setting, responsive to the verification request of an anomalous controller, causes the first controller 120 to transmit the certificate that is assigned to the first controller 120, to the second controllers 100, 101 and 102. Accordingly, the second controllers 100, 101 and 102 in receipt of the certificate verify the certificate by using the pre-stored public key. This process allows checking whether the first controller 120 is anomalous (fake/duplicate). At least one embodiment can deter even the hacker attempts to steal information on the second controllers 100, 101, 102 or interrupt communication between the second controllers 100, 101, 102 and the first controller 120 by forging a key stored in the second controllers 100, 101, 102, since at least one embodiment causes the forged key to be used toward verification failure of the certificate of the first controller 120, disabling second controllers 100, 101, 102 from proceeding to the subsequent step of transmitting their inherent information, resulting in escape from the risk of hacking.

Although Steps S300 to S340, Steps S400 to S470 and Steps S500 to S560 in FIGS. 3 to 5 are described to be sequentially performed, they merely instantiate the technical idea of some embodiments of the present disclosure. Therefore, a person having ordinary skill in the pertinent art would appreciate that various modifications, additions, and substitutions are possible by changing the sequences described in FIGS. 3 to 5 or by performing one or more of Steps S300 to S340, Steps S400 to S470 and Steps S500 to S560 in parallel, without departing from the gist and the embodiment of the present disclosure, and thus steps in FIGS. 3 to 5 are not limited to the illustrated chronological sequences.

The steps shown in FIGS. 3 to 5 can be implemented as computer-readable codes on a computer-readable recording medium. The computer-readable recording medium includes any type of recording device on which data can be read by a computer system. Examples of the computer-readable recording medium include a magnetic recording medium (e.g., a ROM, a floppy disk, a hard disk, etc.), an optically readable medium (e.g., a CD-ROM, a DVD, etc.), and the like. Further, the computer-readable recording medium can be distributed in computer systems connected via a network, wherein computer-readable codes can be stored and executed in a distributed manner.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A method performed by a first controller for providing security for a plurality of second controllers in an in-vehicle network, the method comprising:
   transmitting an inherent information request to a suspicious controller of the plurality of second controllers for an inherent information of the suspicious controller, the inherent information request including a certificate assigned to the first controller;
   receiving an encrypted inherent information of the suspicious controller from the suspicious controller;
   comparing a decrypted inherent information with a pre-stored inherent information;
   determining the suspicious controller to be an anomalous controller when the decrypted inherent information is different from the pre-stored inherent information;
   in response to receiving an update request from a backend server for a specified controller out of the plurality of second controllers, transmitting the inherent information request including the certificate assigned to the first controller to the specified controller; and
   performing a controller information update by receiving an encrypted inherent information of the specified controller from the specified controller and updating the decrypted inherent information in correspondence with the specified controller.

2. The method of claim 1, further comprising:
transmitting the certificate assigned to the first controller to the plurality of second controllers when the plurality of second controllers are initialized;
receiving encrypted inherent information of the second controllers from the second controllers; and
storing the decrypted inherent information of the second controllers in correspondence with the second controllers.

3. The method of claim 1, wherein the inherent information comprises at least one of a boot loader or MAC information of the suspicious controller, and is a hash value of information on the suspicious controller.

4. The method of claim 1, further comprising transmitting, to the backend server, information indicating that the suspicious controller is determined to be the anomalous controller so that the backend server in receipt of the information can take action to limit use of the suspicious controller.

5. The method of claim 1, wherein the inherent information is stored as a table in matching relation with the plurality of second controllers, wherein the table is stored in a hardware security module (HSM) or stored after encryption.

6. The method of claim 1, further comprising transmitting the certificate and a random value together when the inherent information is requested.

7. The method of claim 1, wherein transmitting the inherent information request is performed upon receiving a verification request for the suspicious controller from the backend server.

8. The method of claim 1, wherein the encrypted inherent information is transmitted from the suspicious controller when the suspicious controller that has received the inherent information request succeeds in verifying the certificate.

9. The method of claim 1, wherein the suspicious controller is determined to be the anomalous controller upon receiving no response for a preset time from the suspicious controller that has received the inherent information request, or when the suspicious controller fails to verify the certificate.

10. A non-transitory computer-readable medium storing a computer program, including computer-executable instructions for causing, when executed in a processor, the processor to perform the method of claim 1.

11. An apparatus for providing security for a plurality of second controllers in an in-vehicle network, the apparatus comprising:
a request transmission unit configured to transmit an inherent information request to a suspicious controller out of the plurality of second controllers, the inherent information request including a certificate assigned to the apparatus;
an inherent information reception unit configured to receive an encrypted inherent information of the suspicious controller from the suspicious controller;
a storage unit configured to store inherent information of the second controllers in association with the second controllers;
a comparison unit configured to compare a decrypted inherent information with the inherent information having been stored in the storage unit;
a verification unit configured to determine the suspicious controller to be an anomalous controller when the comparison unit concludes that the decrypted inherent information is different from the inherent information having been stored in the storage unit; and
an update request transmission unit configured to be responsive to an update request from a backend server for a specified controller out of the plurality of second controllers, for transmitting the inherent information request including the certificate assigned to the apparatus to the specified controller; and
wherein a controller information update is performed by causing the inherent information reception unit to receive an encrypted inherent information of the specified controller from the specified controller and updating the decrypted inherent information in the storage unit in correspondence with the specified controller.

12. The apparatus of claim 11, further comprising:
a certificate transmission unit configured to transmit the certificate assigned to the apparatus to the plurality of second controllers when the plurality of second controllers are initialized,
wherein an initial setting is performed by causing the inherent information reception unit to receive encrypted inherent information of the second controllers from the second controllers, and then storing the decrypted inherent information in correspondence with the second controllers.

13. The apparatus of claim 11, wherein the inherent information comprises at least one of a boot loader or MAC information of the suspicious controller, and is a hash value of information on the suspicious controller.

14. The apparatus of claim 11, further comprising a verification result transmission unit configured to transmit, to the backend server, a determination by the verification unit that the suspicious controller is the anomalous controller, wherein the backend server in receipt of the determination takes action to limit use of the suspicious controller.

15. The apparatus of claim 11, wherein the inherent information is stored as a table in matching relation with the plurality of second controllers, wherein the table is stored in a hardware security module (HSM) or stored after encryption.

16. The apparatus of claim 11, wherein the certificate and a random value are transmitted together when the request transmission unit requests the inherent information.

17. The apparatus of claim 11, wherein the request transmission unit is configured to transmit the inherent information request upon receiving a verification request for the suspicious controller from the backend server.

18. The apparatus of claim 11, wherein when the suspicious controller that has received the inherent information request succeeds in verifying the certificate, the suspicious controller transmits the encrypted inherent information.

19. The apparatus of claim 11, wherein the verification unit is configured to determine the suspicious controller to be the anomalous controller upon receiving no response for a preset time from the suspicious controller that has received the inherent information request, or when the suspicious controller fails to verify the certificate.

20. An apparatus for providing security for a plurality of second controllers in an in-vehicle network, the apparatus comprising:
a processor; and
a non-transitory computer-readable recording medium storing computer-readable code that, when executed by the processor, causes the processor to:

send an inherent information request to a suspicious controller out of the plurality of second controllers, the inherent information request including a certificate assigned to the apparatus;

receive an encrypted inherent information of the suspicious controller from the suspicious controller;

store, in a storage unit, inherent information of the second controllers in association with the second controllers;

compare a decrypted inherent information with the inherent information having been stored in the storage unit;

determine the suspicious controller to be an anomalous controller when a result of the comparison concludes that the decrypted inherent information is different from the inherent information having been stored in the storage unit; and in response to an update request from a backend server for a specified controller out of the plurality of second controllers, send the inherent information request including the certificate assigned to the apparatus to the specified controller, wherein a controller information update can be performed by receiving an encrypted inherent information of the specified controller from the specified controller and updating the decrypted inherent information in the storage unit in correspondence with the specified controller.

\* \* \* \* \*